United States Patent Office 3,120,566
Patented Feb. 4, 1964

3,120,566
PROPARGYL NITRAMINE AND METHOD OF MAKING THE SAME
Murray S. Cohen, Convent Station, and Donald D. Perry, Morristown, N.J., and Patrick J. Keenan, Pittsburgh, Pa., assignors to Thiokol Chemical Corporation, Bristol, Pa., a corporation of Delaware
No Drawing. Filed May 2, 1960, Ser. No. 26,366
2 Claims. (Cl. 260—583)

This invention relates to propargyl nitramine and methods of making the same.

It has been found that the new composition of matter, propargyl nitramine, by virtue of its relative insensitivity to mechanical shock, its low density, and its high specific impulse, is an excellent liquid monopropellant for use in rocket motors. Rocket motors using liquid monopropellants are known in the art, and are discussed, for example, in the book "Rocket Propellants," by Francis A. Warren, Reinhold Publishing Corporation, New York, 1958.

The physical properties of propargyl nitramine are as follows:

Density _____ 1.2047/25° C.
Index of refraction _____ 1.4982/20° C.
Boiling point _____ 52° C./0.015 mm. Hg.
Specific impulse _____ 233 sec. at 600 p.s.i.
Density impulse _____ 260
Heat of formation _____ +44.5 Kcal./mole.

The material is most conveniently prepared using the following synthesis.

Propargyl amine is first reacted with ethyl chlorocarbonate at a low temperature in the presence of a base as a scavenger for the acid produced in the reaction. This reaction produces propargyl urethane in yields as high as 82 percent:

$$HC{\equiv}C\,CH_2NH_2 \xrightarrow[KOH]{ClCOOC_2H_5} HC{\equiv}C\,CH_2NHCOOC_2H_5$$

Propargyl urethane is then nitrated with anhydrous nitric acid in acetic anhydride to produce N-nitropropargyl urethane, which is conveniently extracted from the reaction mixture with ether:

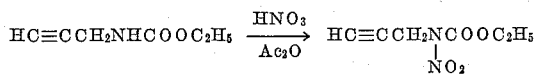

From N-nitropropargyl urethane obtained by distilling the ethereal solution, the ammonium salt of propargyl nitramine is prepared by reaction of the starting material with ammonia, conveniently passed as a gas through a solution of the urethane:

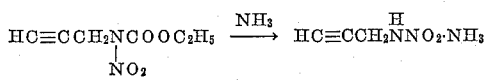

Finally this ammonium salt, after purification, is neutralized with acid, conveniently HCl, to recover propargyl nitramine:

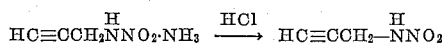

Preferably only a stoichiometric quantity of acid is employed. Ammonium chloride formed in this reaction is easily separated. The product and the solvent are then conveniently separated by distillation. Alternatively, the ammonium salt of propargyl nitramine need not be purified, but, after its formation and separation from the reactant solution, may be simply dissolved in a solvent such as ethanol and distilled with thermal decomposition under high vacuum to yield propargyl nitramine. A product produced in this way may contain small amounts of impurities, which, however, may not interfere with the ultimate use of the product.

The propargyl amine used as the starting material is known in the art and is most conveniently prepared using a modified Delepine reaction. In this synthesis, propargyl bromide or propargyl-p-toluene sulfonate (readily prepared from propargyl alcohol and p-toluene sulfonylchloride) are reacted with hexamethylenetetramine in a chloroform solution to give a quaternary salt:

$$HC{\equiv}C{-}CH_2Br + C_6H_{12}N_4 \rightarrow HC{\equiv}C{-}CH_2C_6H_{12}N_4^+\ Br^-$$

This salt is decomposed in the presence of an acid to give a salt of propargyl amine:

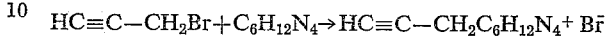

The salt is then neutralized to yield free propargyl amine. Because the amine is apparently sensitive to water or to heating in the presence of strong bases, the use of a weak base in the neutralization is preferred.

The synthesis of propargyl amine outlined above proceeds most conveniently when the salt produced by the reaction of propargyl bromide and hexamethylenetetramine is produced in chloroform solution, and the solid quaternary salt precipitating is then dissolved in ethanol. Dry hydrogen chloride is passed through the ethanolic solution to produce the hydrochloride of propargyl amine. This salt is then decomposed by adding with stirring to an excess of diethylenetriamine under reduced pressure. The free amine liberated by this reaction is evaporated and collected in Dry Ice traps. A 66.5 percent yield has been obtained in the synthesis. The compound has been identified by infrared analysis and by its refractive index.

Alternatively, propargyl amine may be synthesized by reaction of a propargyl halide with liquid ammonia. The resulting solution is extracted with ether and the propargyl amine formed is removed by distillation.

The following examples show the practice of the invention by way of illustration.

EXAMPLE 1

*Propargyl Amine*

Propargyl amine was prepared from propargyl bromide and liquid ammonia under conditions leading to little formation of higher amine products. Six moles (714 g.) of freshly distilled propargyl bromide were added dropwise over a two hour period to two liters of liquid ammonia. After stirring the reaction mixture for an additional hour, excess ammonia was allowed to boil off while being simultaneously replaced with an equal volume of ether. Immersion of the reaction flask in a warm water bath insured complete removal of excess ammonia. The ammonium bromide formed during the reaction was filtered off, and the resulting ethereal solution was distilled giving the following products:

| Product | Weight (g.) | Moles | Boiling Point |
|---|---|---|---|
| Propargyl Amine | 95.0 | 1.7 | 81.0°–83.0° C. |
| Dipropargyl Amine | 87.5 | 1.1 | 53°–6° C./13–15 mm. |
| Tripropargyl Amine | 20.6 | 0.2 | 80°–3° C./13–15 mm. |

EXAMPLE 2

*Propargyl Urethane*

To 27.5 g. (0.5 mole) of propargyl amine in 250 ml. of ether, were added dropwise, with stirring, over a one and one-half hour period 55.0 g. (0.5 mole) of ethyl chlorocarbonate. The pot temperature was kept at −5° C. to +5° C. during this exothermic reaction. After stirring for another half-hour, 28.0 g. (0.5 mole) of potassium hydroxide dissolved in 50 ml. of water were added dropwise to the milky white solution maintained at −5° C. to 0° C. The reaction mixture was allowed to come to room temperature and remain there for forty hours before separation of the ether layer from the aqueous layer. After extraction of the aqueous layer with ether, the ether solutions were combined and distilled to give 50.4 g. (79 percent yield) of crude propargyl urethane. The crude product was redistilled to give 33.5 g. (50 percent yield) of a water-white liquid boiling at 52–4° C./.05–0.3 mm.

EXAMPLE 3

*N-Nitropropargyl Urethane*

Propargyl urethane (33.0 g.) was added dropwise to a cooled (−10° to −20° C.) mixture of 250 ml. of acetic anhydride and 125 ml. of anhydrous nitric acid (99.8 percent). The mixture was stirred for two hours at −5° C. to −10° C., allowed to come to +10° C., and poured over 500 ml. of crushed ice. It was extracted with ether, and the ether extracts were then washed until neutral with many portions of cold water. Upon distillation of the dried ethereal solution, 36.6 g. (85 percent yield) of crude N-nitropropargyl urethane were obtained. Redistillation of the crude product gave 29.4 g. (68 percent yield) of a pale yellow liquid boiling at 74°–80° C./0.1–0.3 mm.

*Analysis.*—Calculated for $C_6H_8N_2O_2$: C—41.8; H—4.7; N—16.3. Found: C—42.3; H—5.0; N—17.7.

EXAMPLE 4

*Ammonium Salt of Propargyl Nitramine*

Gaseous ammonia was slowly bubbled into a solution 28 g. of N-nitropropargyl urethane in 250 ml. of ether for two hours. The ammonium salt of propargyl nitramine thus formed was separated, washed with ether, and dried in a vacuum desiccator. A fluffy crystalline material (18 g. 95.7 percent yield) was obtained, the infrared spectrum of which was consistent with that of the desired product.

*Analysis.*—Calculated for $C_3H_6N_2O_2$: C—30.7; H—6.0. Found: C—30.7; H—6.3.

EXAMPLE 5

*Propargyl Nitramine*

The ammonium salt of propargyl nitramine (17 g.) was dissolved in 100 ml. of ethanol. To this solution was added dropwise, with stirring, an alcoholic solution containing the stoichiometric quantity of hydrogen chloride necessary to neutralize the ammonium salt and liberate the nitramine. The ammonium chloride formed was filtered off and the solvent removed by distillation under reduced pressure (B.P. 56°–60° C./0.1 mm.). The infrared spectrum of this clear liquid confirmed it to be propargyl nitramine. On standing the product darkened, but redistillation again yielded a pure colorless product, with very little high boiling material remaining in the distillation flask.

*Analysis.*—Index of refraction at 25° C. ($n_D^{25}$) is 1.4982. Calculated for $C_3H_4N_2O_2$: C—36.00; H—4.02; N—28.00. Found: C—35.81; H—4.01; N—28.01.

Although specific embodiments have been herein shown and described, it is understood that they are illustrative, and are not to be construed as limiting on the scope and spirit of the invention.

What is claimed is:

1. Propargyl nitramine.

2. The method of making propargyl nitramine which comprises condensing propargyl amine with a lower alkyl chlorocarbonate to form propargyl urethane, nitrating said propargyl urethane with anhydrous nitric acid at a temperature below —5° C. to form N-nitropropargyl urethane, contacting said N-nitropropargyl urethane with ammonia to form the ammonium salt of propargyl nitramine, and then liberating propargyl nitramine from said salt.

References Cited in the file of this patent

Richter: "Organic Chemistry," vol. 1, p. 201 (1947).
Taylor et al.: "Sidgwick's Organic Chemistry of Nitrogen." pp. 273 and 454–5 (1949).